April 15, 1941.     G. WAGSTAFF     2,238,854
DETACHABLE FASTENING DEVICE
Filed Dec. 17, 1938
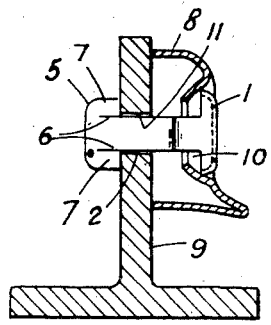
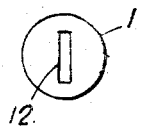
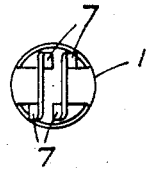
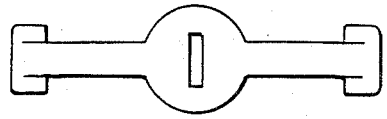
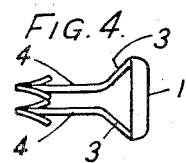
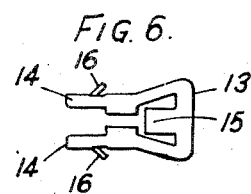
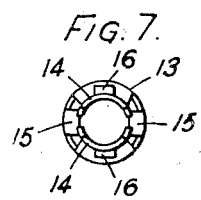
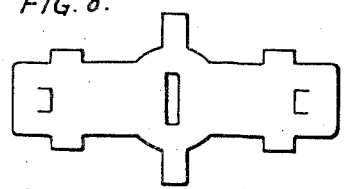
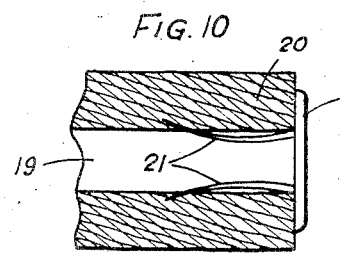
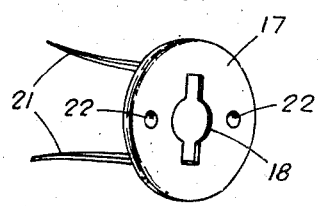
Inventor:
George Wagstaff.
by Walter S. Jones
Att'y.

Patented Apr. 15, 1941

2,238,854

UNITED STATES PATENT OFFICE 2,238,854

DETACHABLE FASTENING DEVICE

George Wagstaff, Nottinghamshire, England, assignor to Carr Fastener Company Limited, Stapleford, England Application December 17, 1938, Serial No. 246,386
In Great Britain February 2, 1938

3 Claims. (Cl. 85—5)

This invention relates to devices for detachably fastening two or more apertured members together.

It is an object of this invention to provide an improved fastener of this kind which ensures an efficient locking action between the members to be fastened and which is comparatively simple and cheap to manufacture.

According to the present invention the fastener consists of a member comprising a head portion from which extends a shank consisting of resilient metal arms provided with lateral projections. The head is preferably larger than the shank portion. The fastener is inserted by an axial movement through apertures in the members to be fastened the head engaging the face of one of the members and the lateral projection extending through the apertures in both members. On rotation of the fastener the projections overlap the edges of the adjacent aperture to lock the members together. The arms may be formed from a flat metal strip bent into U-shape and the base of the U pressed and shaped to form an integral enlarged head member. Alternatively the resilient arms may be secured to a separately formed enlarged head member. Further each lateral projection of the arms may have a depending flexible cam portion.

To enable the invention to be fully understood it will now be described with reference to the accompanying drawing, in which:

Fig. 1 is a cross sectional view of a fastener, according to one embodiment of the invention, in position securing a moulding strip to a metal window frame, Fig. 2 is an end view showing the head of the fastener, Fig. 3 is an end view of the resilient arms, Fig. 4 is a plan view of the fastener, and Fig. 5 is a plan view of the sheet metal blank from which the fastener is made, Fig. 6 is a plan view of a modified form of fastener, Fig. 7 is an end view of the resilient arms of the fastener according to Fig. 6, Fig. 8 is a plan view of the sheet metal blank from which the modified fastener is made, Fig. 9 is a perspective view of a plate for use when the fastener is adapted to secure a panel to a support, and Fig. 10 is a part sectional view showing the plate attached to a support.

As shown in Figs. 1 to 5 of the accompanying drawing a sheet metal blank as shown in Fig. 5 is pressed and bent to form a circular flanged head 1 having a shank consisting of a pair of flat resilient arms 2 extending from the same face of the head but from oppositely disposed parts of the periphery. The arms are bent to form inwardly extending portions 3 and parallel portions 4. The free end of each arm has a lateral projection 5 at each side which is slit along the line 6 to provide depending resilient tongues 7. The depending tongues 7 are bent away from the arm 2, the tongue on one side of an arm being bent in an opposite direction to the tongue on the opposite side thereby facilitating the rotation of the fastener.

In Fig. 1 the fastener is shown securing a moulding strip 8 to a metal window frame 9. The shank is inserted through an aperture 10 in the moulding strip 8 and through an elongated aperture 11 in the frame 9, the head seating in the countersunk hole of the strip 8 and the tongues 7 projecting beyond the frame 9. The fastener is then rotated by means of a screw driver which enters the slot 12 and the tongues 7 are brought into position overlapping the edges of the aperture 11 in the frame 9 to lock the fastener, the resilient tongues ensuring a firm non-rattling connection.

It will be understood that the length of the resilient arms and the depending portions will vary according to the thickness or spacing of the members to be fastened. By providing comparatively long, readily flexible, depending portions small differences in the thickness or spacing of the members may be accommodated by the degree of flexing of the depending portions and in this way a fastener may be used for connecting different sets of members.

In the modified form of fastener according to Figs. 6-8 the sheet metal blank as shown in Fig. 8 is pressed and bent to form a circular head 13 and a pair of arms 14 curved in cross section which together form a tubular shank. The portions of the arms 14 adjacent the head 13 are bent inwardly and together with lugs 15 projecting from the head form a conical base portion adapted to fit in a correspondingly shaped countersunk hole in one of the members to be connected. Laterally projecting tongues 16 are formed by cutting and bending metal from the arms 14. The modified fastener according to Figs. 6-8 provides a particularly strong fastener, the curved arms 14 ensuring added strength without impairing resiliency.

The fastener according to Figs. 6-8 is adapted to be used in a similar manner to the fastener shown in Fig. 1, the head 13 seating in the countersunk hole 10 and the tongues 16 overlapping the edges of the aperture 11 when the fastener is rotated into locked position.

Instead of being circular the heads of the fasteners may be of square, hexagonal or any other shape to facilitate engagement by an appropriate tool for rotating the fastener.

The fastener may be adapted to secure a panel to a support such as for example the detachable back panel of a wireless receiver or other cabinet. In this case slotted plates through which the arms of the fastener are adapted to extend may be mounted at suitable points on the cabinet.

Figs. 9 and 10 show one form of plate for this purpose, the plate comprising a flat circular portion 17 provided with a slot of double keyhole shape 18 to facilitate the insertion of the fastener. The plate is inserted into a recess 19 formed in the frame 20 of the cabinet and secured by driving the pointed ends of the curved prongs 21 into the walls of the recess. To secure a panel to the frame the fastener is inserted through an aperture in the panel and then through the slot 18 in the plate, the fastener being rotated to bring the lateral projections to rest in the depressions 22 formed in the face of the plate portion 17.

The prongs 21 are preferably integral with the plate portion 17 and both may be formed of sheet metal. The prongs may extend from the periphery of the plate portion and instead of entering the recess 19, short prongs may be provided which are driven into the frame adjacent to the recess. Alternatively the prongs may be made sufficiently resilient to secure the plate in position by merely gripping the inner face of the wall of the aperture 19 without piercing the wall.

I claim:

1. A fastener for detachably fastening apertured members together comprising a shank in the form of a pair of substantially flat resilient metal arms extending from a head portion and the free end of each arm being provided with a laterally projecting flexible portion at each side, the shank being adapted to extend through apertures in the members to be fastened, the head portion engaging the face of one of the members and the lateral projections being adapted, on rotation of the fastener, to overlap the edges of the aperture in another of the members to lock the fastener in position.

2. A fastener for detachably fastening apertured members together comprising a shank in the form of a pair of substantially flat resilient metal arms extending from a head portion and the free end of each arm being provided with a laterally projecting flexible portion at each side, said flexible portions comprising tongues formed by splits between them and the arms, and said tongues being bent out of the planes of the arms, the shank being adapted to extend through apertures in the members to be fastened, the head portion engaging the face of one of the members and the lateral projections being adapted, on rotation of the fastener, to overlap the edges of the aperture in another of the members to lock the fastener in position.

3. A fastener for detachably fastening apertured members together comprising a shank in the form of a pair of substantially flat resilient metal arms extending from a head portion and the free end of each arm being provided with a laterally projecting flexible portion at each side, said flexible portions comprising tongues formed by splits between them and the arms, and said tongues being bent out of the planes of the arms and the two tongues on one arm being bent in opposite directions from each other, the shank being adapted to extend through apertures in the members to be fastened, the head portion engaging the face of one of the members and the lateral projections being adapted, on rotation of the fastener, to overlap the edges of the aperture in another of the members to lock the fastener in position.

GEORGE WAGSTAFF.